US012734778B2

(12) United States Patent
Takeuchi et al.

(10) Patent No.: US 12,734,778 B2
(45) Date of Patent: Sep. 15, 2026

(54) MANIPULATION DEVICE AND METHOD

(71) Applicant: Alps Alpine Co., Ltd., Tokyo (JP)

(72) Inventors: Shota Takeuchi, Miyagi-ken (JP); Hideo Kawase, Miyagi-ken (JP); Yukimitsu Yamada, Miyagi-ken (JP); Takashi Otomo, Miyagi-ken (JP); Kazuhiro Takahashi, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 192 days.

(21) Appl. No.: 18/907,949

(22) Filed: Oct. 7, 2024

(65) Prior Publication Data

US 2025/0026099 A1 Jan. 23, 2025

Related U.S. Application Data

(63) Continuation of application No. PCT/JP2023/008286, filed on Mar. 6, 2023.

(30) Foreign Application Priority Data

May 18, 2022 (JP) ................................ 2022-081739

(51) Int. Cl.
*A63F 13/24* (2014.01)
*B30B 13/00* (2006.01)
*B30B 15/26* (2006.01)

(52) U.S. Cl.
CPC .............. *B30B 15/26* (2013.01); *B30B 13/00* (2013.01)

(58) Field of Classification Search
CPC .......... B30B 15/26; B30B 13/00; G05G 5/03; G05G 5/04; G05G 25/00; G06F 3/0362; H01H 13/00; H01H 13/02
See application file for complete search history.

(56) References Cited

U.S. PATENT DOCUMENTS 5,332,965 A * 7/1994 Wolf .................... G01D 3/0365 324/225
2008/0023315 A1 1/2008 Morisawa
(Continued)

FOREIGN PATENT DOCUMENTS

JP 2007-212380 8/2007
JP 2008-27843 2/2008
(Continued)

OTHER PUBLICATIONS

International Search Report from International Application No. PCT/JP2023/008286 dated May 23, 2023, with English translation.

*Primary Examiner* — Masud Ahmed
(74) *Attorney, Agent, or Firm* — Beyer Law Group LLP

(57) ABSTRACT

A manipulation device has: a manipulation unit on which a movement manipulation is possible; a sensor that outputs a detection value according to the position of the manipulation unit; a conversion unit that converts a detection value acquired by an acquisition unit to information about the position of the manipulation unit, according to conversion information; an adjustment unit that can adjust the movement limit position of the manipulation unit; and a creation unit that acquires, from the sensor, a detection value at the time when the manipulation unit has reached each of a plurality of movement limit positions adjustable by the adjustment unit, and creates the conversion information according to a plurality of acquired detection values and to positional information indicating the actual positions of the plurality of movement limit positions.

9 Claims, 9 Drawing Sheets

(56) References Cited

U.S. PATENT DOCUMENTS

| | | | | |
|---|---|---|---|---|
| 2014/0015641 | A1* | 1/2014 | White | G06K 19/0715<br>340/10.1 |
| 2021/0060418 | A1* | 3/2021 | Kawashima | A63F 13/24 |
| 2022/0401828 | A1 | 12/2022 | Kawashima et al. | |
| 2023/0349453 | A1* | 11/2023 | Umei | F16H 25/2015 |
| 2025/0341853 | A1* | 11/2025 | Wall | B63H 25/02 |

FOREIGN PATENT DOCUMENTS

| | | |
|---|---|---|
| JP | 2008-173186 | 7/2008 |
| JP | 2019-219948 | 12/2019 |
| JP | 2021-99864 | 7/2021 |
| WO | 2022/085704 | 4/2022 |

* cited by examiner

FIG. 8

| STROKE [mm] | DETECTION VALUE OF SENSOR |
|---|---|
| 0 | 497 |
| 0.15 | 774 |
| 0.16 | 792 |
| 0.17 | 810 |
| 0.18 | 826 |
| 0.19 | 844 |
| 0.20 | 865 |
| 0.21 | 885 |
| 0.26 | 958 |
| 0.27 | 978 |
| 0.28 | 999 |

MANIPULATION DEVICE AND METHOD

CLAIM OF PRIORITY

This application is a Continuation of International Application No. PCT/JP2023/008286 filed on Mar. 6, 2023, which claims benefit of Japanese Patent Application No. 2022-081739 filed on May 18, 2022. The entire contents of each application noted above are hereby incorporated by reference.

BACKGROUND OF THE INVENTION

1. Field of the Invention

The present invention relates to a manipulation device and a method.

2. Description of the Related Art

Japanese Unexamined Patent Application Publication No. 2019-219948 discloses a technology by which, in a manipulation device having a manipulation member on which a pressing manipulation is possible, it is possible to control a load during the pressing manipulation and to present a tactile sense to the manipulator by converting a rotational angle detected by a rotational angle detection sensor to an amount by which the manipulation member has been pressed and controlling a motor according to the amount of pressing.

With the technology in Japanese Unexamined Patent Application Publication No. 2019-219948, however, a conversion expression is needed to convert the rotational angle detected by the rotational angle detection sensor to an amount by which the manipulation member has been pressed. However, when an appropriate conversion expression is manually set individually for each manipulation device, extra work and time may be taken. If a conversion expression common to a plurality of manipulation devices is used, conversion precision is lowered due to differences among individual manipulation devices themselves and to other differences in assembling error, time-varying changes, and the like among the individual manipulation devices.

SUMMARY OF THE INVENTION

A manipulation device according to an embodiment has: a manipulation unit on which a movement manipulation is possible; a sensor that outputs a detection value according to the position of the manipulation unit; a conversion unit that converts a detection value acquired by an acquisition unit to information about the position of the manipulation unit, according to conversion information; an adjustment unit that can adjust the movement limit position of the manipulation unit; and a creation unit that acquires, from the sensor, a detection value at the time when the manipulation unit has reached each of a plurality of movement limit positions adjustable by the adjustment unit, and creates the conversion information according to a plurality of acquired detection values and to positional information indicating the actual positions of the plurality of movement limit positions.

According to the manipulation device in the embodiment, it is possible to easily create highly precise conversion information used to convert a detection value of the sensor to the position of the manipulation unit.

BRIEF DESCRIPTION OF THE DRAWINGS

FIG. 8 illustrates an example of positional information and a detection value, which are used in the manipulation device in the embodiment, for each movement limit position.

DESCRIPTION OF THE PREFERRED EMBODIMENTS

An embodiment will be described below with reference to the drawings. In the description below, the Z-axis direction will be taken as the up-down direction, the X-axis direction will be taken as the front-back direction, and the Y-axis direction will be taken as the left-right direction, for convenience of explanation. Also, the positive Z-axis direction will be taken as the upward direction, the positive X-axis direction will be taken as the forward direction, and the positive Y-axis direction will be taken as the right direction.

<Structure of Manipulation Device 100>

Figure 1:
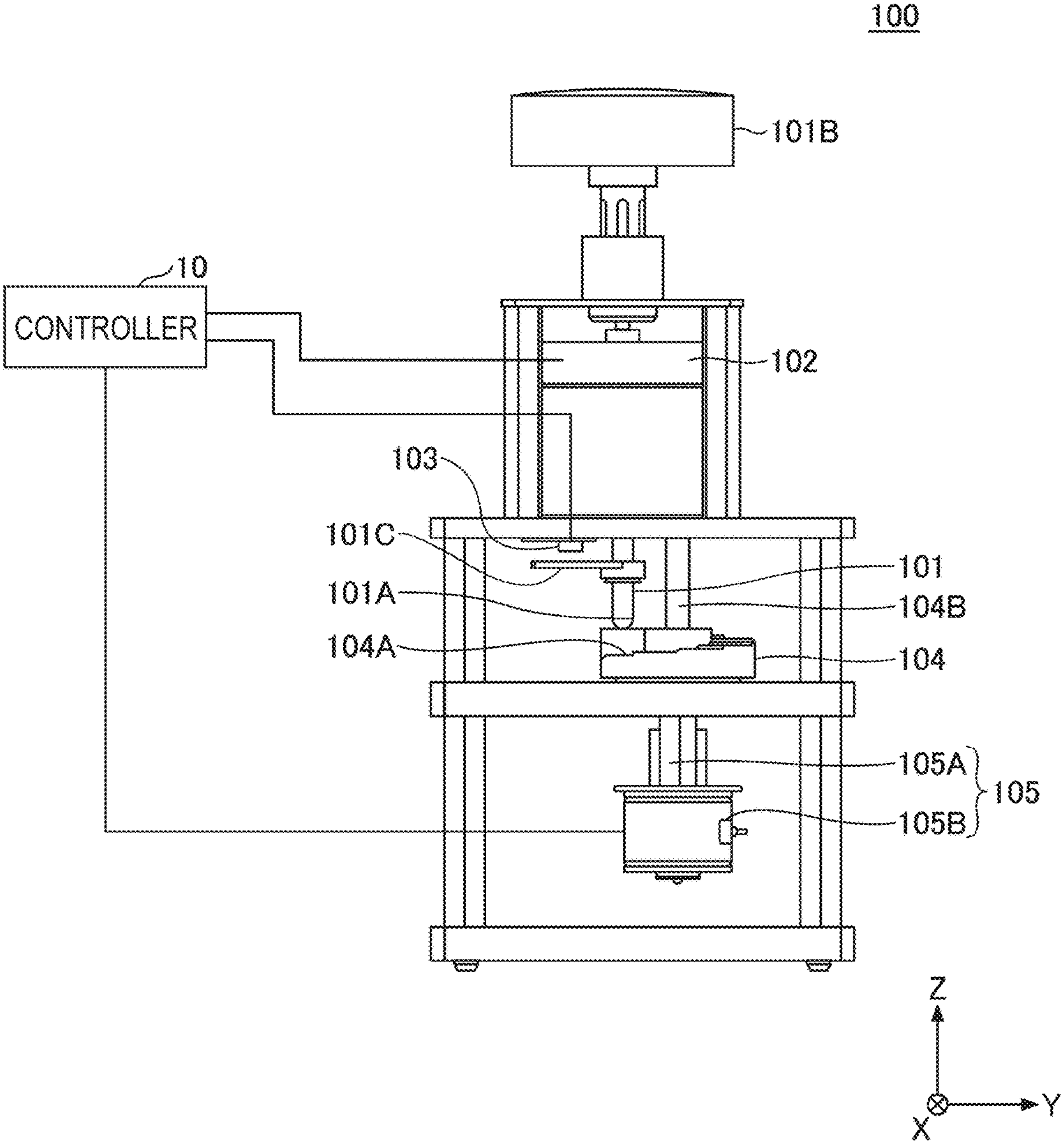
FIG. 1 is a side view of a manipulation device according to an embodiment.
Figure 2:
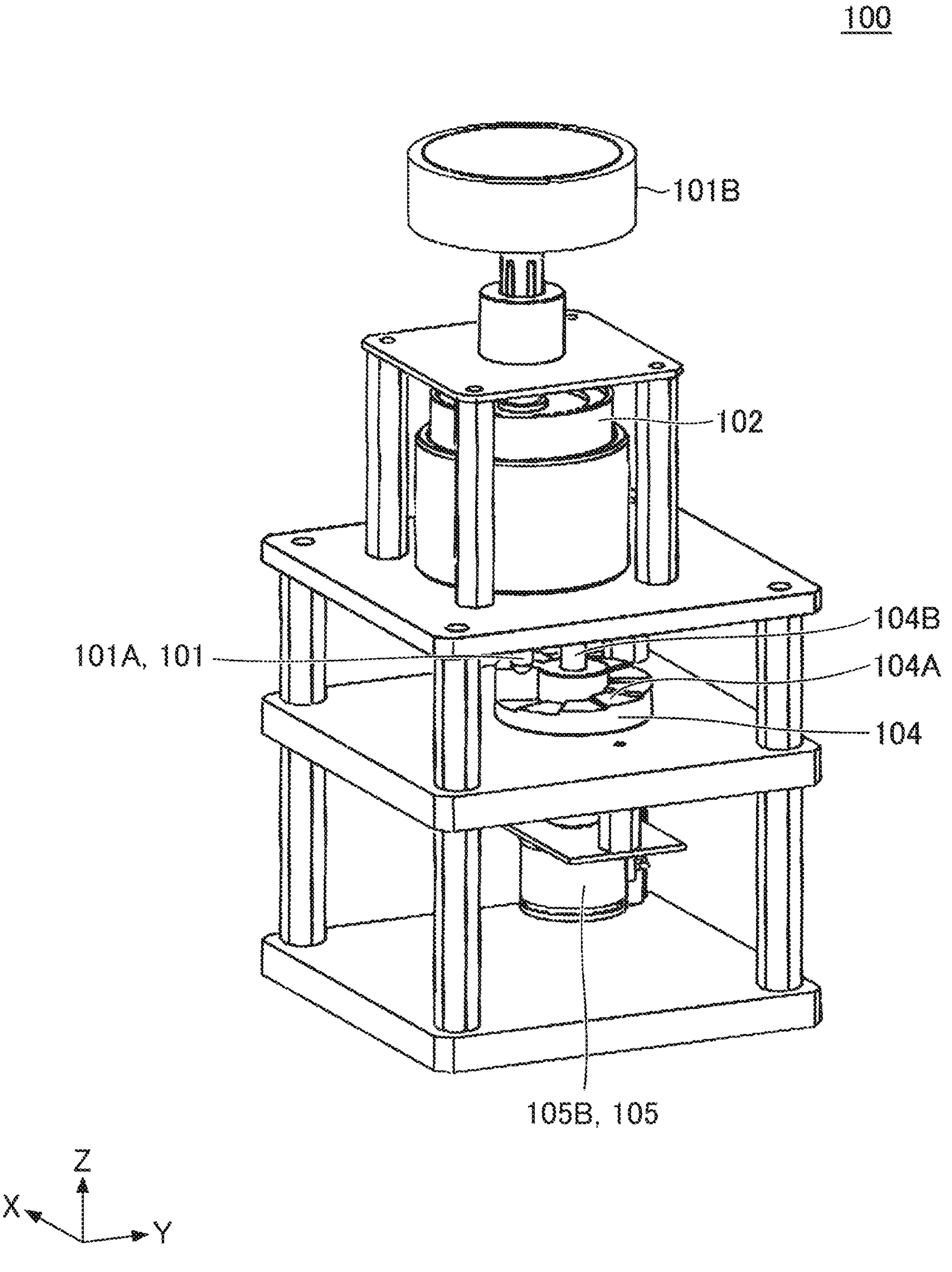
FIG. 2 is an external perspective view of the manipulation device in the embodiment.

FIG. 1 is a side view of a manipulation device 100 according to an embodiment. FIG. 2 is an external perspective view of the manipulation device 100 in the embodiment. The manipulation device 100 illustrated in FIGS. 1 and 2 is used in various electronic units (game controllers and the like, for example). With the manipulation device 100, a movement manipulation by pressing or the like by the user is possible. As illustrated in FIGS. 1 and 2, the manipulation device 100 has a manipulation shaft 101 (an example of a manipulation unit) extending in the up-down direction (Z-axis direction). A manipulation knob 101B is attached to the manipulation shaft 101. In the example illustrated in FIGS. 1 and 2, the manipulation knob 101B is attached to the upper end of the manipulation shaft 101. With the manipulation device 100, the manipulation shaft 101 can be moved downward when a pressing manipulation (an example of the movement manipulation) is performed in the downward direction for the manipulation knob 101B. An amount by which the manipulation shaft 101 moves downward is detected by a sensor 103 and is output from the sensor 103 to a controller 10.

As illustrated in FIGS. 1 and 2, the manipulation device 100 has the manipulation shaft 101, a force sense generator 102, the sensor 103, an adjustment unit 104, an electrically powered unit 105, and the controller 10.

The manipulation shaft 101 is a rod-like member extending in the up-down direction (Z-axis direction). The manipulation shaft 101 is disposed so as to pass through the interior of the force sense generator 102. The manipulation shaft 101 can linearly move in the interior of the force sense generator 102 in the up-down direction (Z-axis direction). A tip 101A in a hemispherical shape is formed at the lower end (the end on the negative side of the Z axis) of the manipulation shaft 101. The tip 101A protrudes downward from the lower surface of the force sense generator 102. The upper end (the end on the positive side of the Z axis) of the manipulation shaft 101 protrudes upward from the upper surface of the force sense generator 102. The manipulation knob 101B is attached to the upper end (the end on the positive side of the Z axis) of the manipulation shaft 101.

The force sense generator 102 may be an example of a load applying unit. The force sense generator 102 supports the manipulation shaft 101, which passes through the interior of the force sense generator 102, so that the manipulation shaft 101 is linearly movable in the up-down direction (Z-axis direction), and applies a force to the manipulation shaft 101. Thus, the force sense generator 102 applies a load to the pressing manipulation for the manipulation knob 101B. The force sense generator 102 can operate under control of the controller 10. In this embodiment, a voice coil motor is used as the force sense generator 102. However, this is not a limitation; another device (such as, for example, a linear motor or a device that uses a magneto-rheological fluid) may be used as the force sense generator 102.

The sensor 103 may output a detection value according to the position of the manipulation shaft 101. Specifically, the sensor 103 acquires the detection value according to the position of the manipulation shaft 101 and outputs the acquired detection value to the controller 10. The sensor 103 outputs a detection value according to the position of the manipulation shaft 101 at least in its axial direction. In this embodiment, the sensor 103 is disposed on the force sense generator 102, so the sensor 103 outputs a detection value according to the distance to a reflecting plate 101C attached to the manipulation shaft 101. The sensor 103 may be, for example, a photo sensor.

The adjustment unit 104 is a member that can adjust the movement limit position of the manipulation shaft 101. The adjustment unit 104 has a discoidal shape when viewed in, for example, the X-axis direction. The upper surface of the adjustment unit 104 is a contact surface 104A that the tip 101A of the manipulation shaft 101 will come into contact with. As illustrated in FIGS. 1 and 2, the contact surface 104A is formed spirally in a stepped shape so that its height position becomes higher with respect to the lowest height position as the height position proceeds counterclockwise in the circumferential direction. A rotational shaft 104B in a rod shape, which extends in the up-down direction (Z-axis direction), is also provided at the center of the adjustment unit 104 in the X-axis direction and Y-axis direction. Thus, the adjustment unit 104 is rotatable about the rotational shaft 104B. The rotational shaft 104B has a greater offset in the right direction (the positive direction of the Y axis) than does the manipulation shaft 101. Thus, with the manipulation device 100 in the embodiment, the tip 101A of the manipulation shaft 101 can be brought into contact with the contact surface 104A.

The electrically powered unit 105 is a device that can move the adjustment unit 104 to cause it to change the movement limit position of the manipulation shaft 101. Specifically, the electrically powered unit 105 rotates and moves the adjustment unit 104 to cause it to change the movement limit position of the manipulation shaft 101. The electrically powered unit 105 has a rotational axis 105A in a rod shape, which extends in the up-down direction (Z-axis direction), and a rotation driving body 105B, which can rotate the rotational axis 105A. The rotation driving body 105B can operate under control of the controller 10. A stepping motor, for example, can be used as the rotation driving body 105B. The rotational axis 105A is disposed concentrically with the rotational shaft 104B of the adjustment unit 104 and below the rotational shaft 104B. The rotational axis 105A is linked to the rotational shaft 104B. Thus, the electrically powered unit 105 can rotate the adjustment unit 104 by driving of the rotation driving body 105B to rotate the rotational axis 105A.

<Operation of Manipulation Device 100>

With the manipulation device 100 in the embodiment, when a pressing manipulation for the manipulation knob 101B is performed, the manipulation shaft 101 moves downward. At this time, the amount of movement of the manipulation shaft 101 is detected by the sensor 103. Also, at this time, the manipulation device 100 can apply a driving force to the manipulation shaft 101 in the up-down direction (Z-axis direction) with the force sense generator 102. With the manipulation device 100, when the tip 101A of the manipulation shaft 101 is brought into contact with the contact surface 104A of the adjustment unit 104, further downward movement of the manipulation shaft 101 is prevented.

With the manipulation device 100 in the embodiment, when the adjustment unit 104 is rotated and moved under control of the controller 10, so the movement limit position of the manipulation shaft 101 can be adjusted to any of a plurality of movement limit positions.

Specifically, with the manipulation device 100 in the embodiment, the lower the height position of the contact surface 104A positioned immediately below the tip 101A is, the more greatly the maximum amount of pressing of the manipulation shaft 101 can be increased. The higher the height position of the contact surface 104A positioned immediately below the tip 101A is, the more greatly the maximum amount of pressing of the manipulation shaft 101 can be reduced.

Example of Tactile Presentation Control by Controller 10

Figure 3:
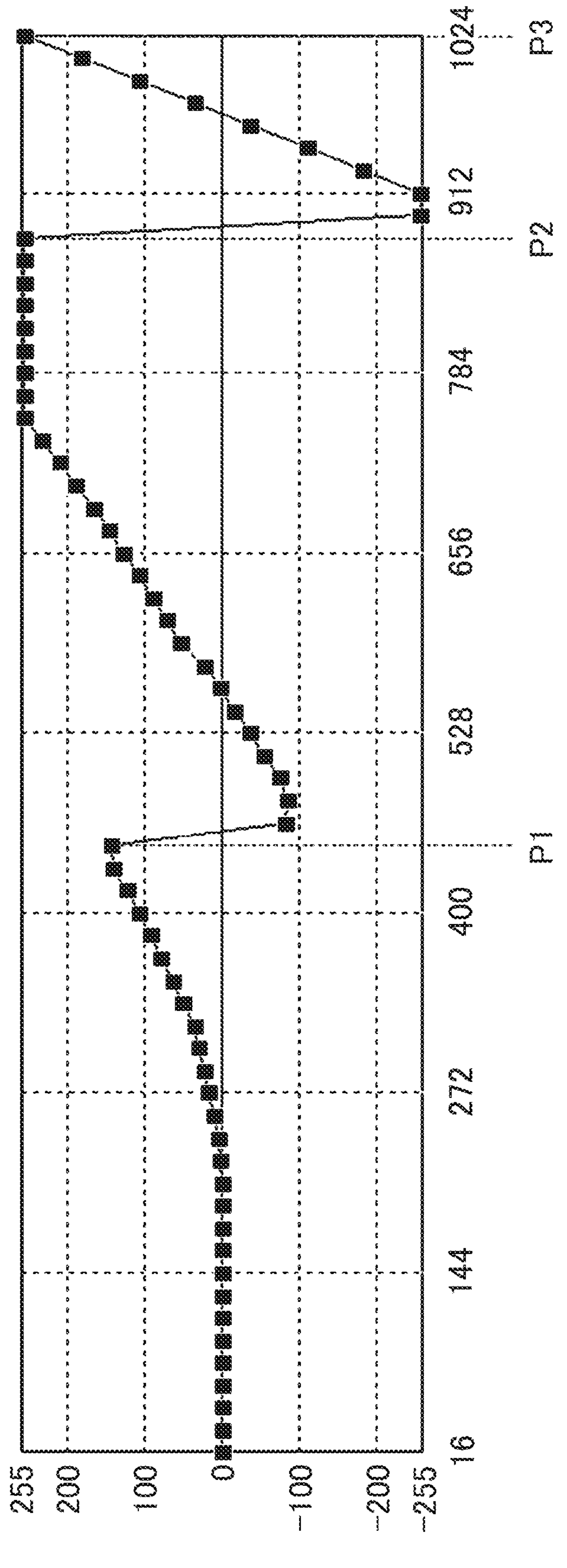
FIG. 3 is a graph illustrating an example of load characteristics used by the manipulation device in the embodiment in tactile presentation control.

FIG. 3 is a graph illustrating an example of load characteristics used by the manipulation device 100 in the embodiment in tactile presentation control. The graph illustrated in FIG. 3 represents load characteristics used by the controller 10 included in the manipulation device 100 to control a load during a pressing manipulation for the manipulation knob 101B. In the graph in FIG. 3, the vertical axis represents load during a pressing manipulation and the horizontal axis indicates the amount of pressing in the pressing manipulation (that is, the amount of downward movement of the manipulation shaft 101). Also, in the graph in FIG. 3, P1 indicates a first pressing position (pressing amount 448), P2 indicates a second pressing position (pressing amount 880), and P3 indicates a third pressing position (pressing amount 1024).

Until the pressing position of the manipulation knob 101B reaches the first pressing position P1, a force applied to the manipulation shaft 101 by the force sense generator 102 is controlled by the controller 10 in such a way that a load during the pressing manipulation is adjusted so that as the amount of pressing gradually increases, the load is gradually increased as illustrated in FIG. 3.

When the pressing position of the manipulation knob 101B has reached the first pressing position P1, the force applied to the manipulation shaft 101 by the force sense generator 102 is controlled by the controller 10 in such a way that the load during the pressing manipulation is steeply reduced from the first maximum value (150) to the first minimum value (−100) as illustrated in FIG. 3. At this time, since the load during the pressing manipulation is steeply reduced, the manipulation knob 101B is urged to the same direction as the manipulation direction (that is, downward direction). Thus, the manipulation device 100 can present a click feeling to the manipulator.

Next, until the pressing position of the manipulation knob 101B reaches the second pressing position P2 after the first pressing position P1 has been reached, the force applied to the manipulation shaft 101 by the force sense generator 102 is controlled by the controller 10 in such a way that the load during the pressing manipulation is adjusted so that as the amount of pressing gradually increases, the load is gradually increased as illustrated in FIG. 3.

When the pressing position of the manipulation knob 101B has reached the second pressing position P2, the force applied to the manipulation shaft 101 by the force sense generator 102 is controlled by the controller 10 in such a way that the load during the pressing manipulation is steeply reduced from the second maximum value (255) to the second minimum value (−255) as illustrated in FIG. 3. Thus, the manipulation device 100 can present a click feeling to the manipulator.

Next, until the pressing position of the manipulation knob 101B reaches the third pressing position P3 after the second pressing position P2 has been reached, the force applied to the manipulation shaft 101 by the force sense generator 102 is controlled by the controller 10 in such a way that the load during the pressing manipulation is adjusted so that as the amount of pressing gradually increases, the load is gradually increased as illustrated in FIG. 3.

When the pressing position of the manipulation knob 101B has reached the third pressing position P3, the load during the pressing manipulation is controlled to the second maximum value (255) as illustrated in FIG. 3.

Example of Functional Structure of Controller 10

Figure 4:
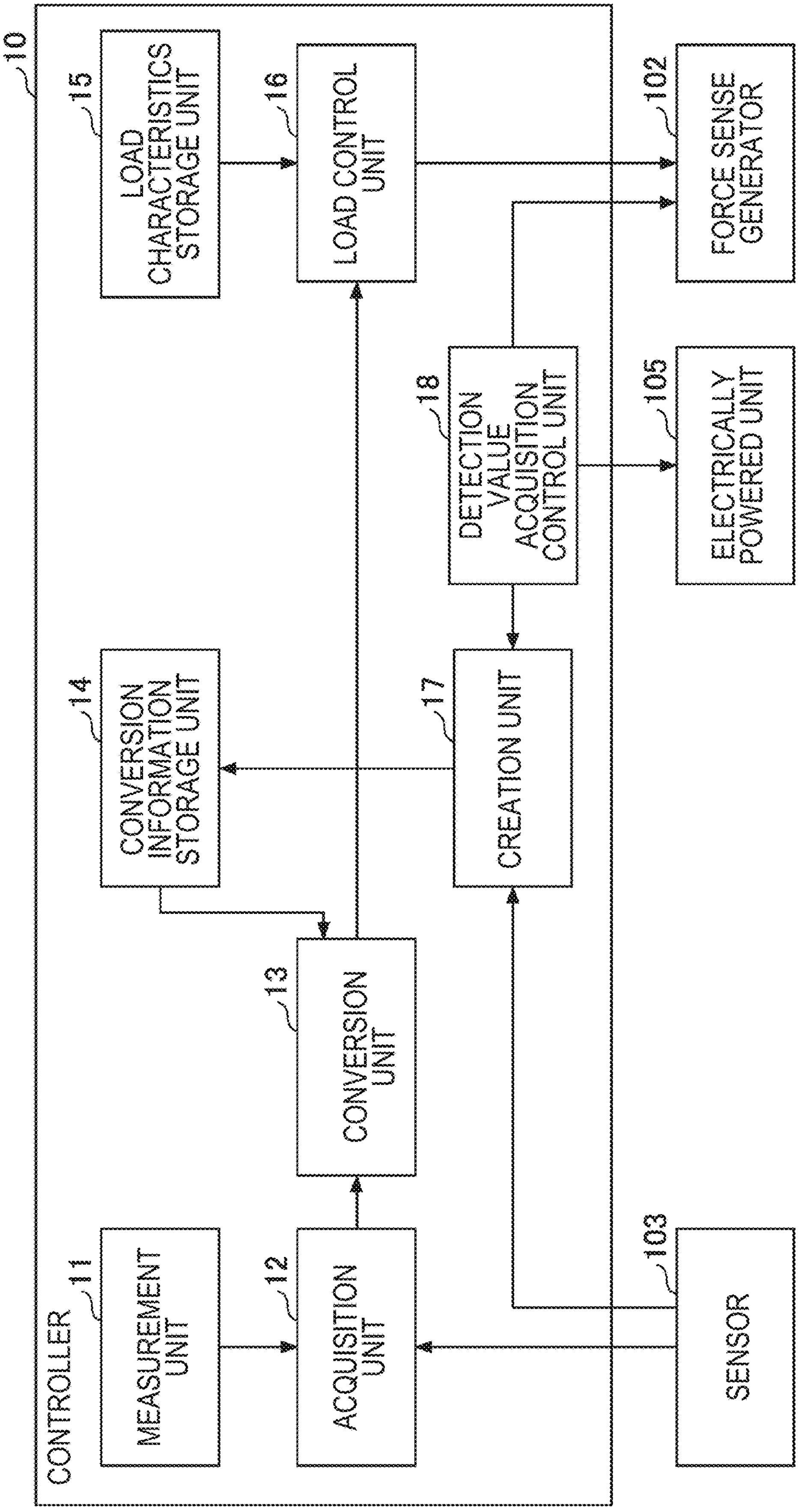
FIG. 4 illustrates an example of the functional structure of a controller included in the manipulation device in the embodiment.

FIG. 4 illustrates an example of the functional structure of the controller 10 included in the manipulation device 100 in the embodiment. As illustrated in FIG. 4, the controller 10 has a measurement unit 11, an acquisition unit 12, a conversion unit 13, a conversion information storage unit 14, a load characteristics storage unit 15, a load control unit 16, a creation unit 17, and a detection value acquisition control unit 18.

The measurement unit 11 repeatedly measures time taken until a sensor read moment occurs. In the controller 10, the sensor read moment repeatedly occurs at predetermined time intervals. The acquisition unit 12 acquires a detection value output from the sensor 103 each time a sensor read moment occurs. The conversion unit 13 converts a detection value acquired by the acquisition unit 12 to a stroke position of the manipulation shaft 101 (an example of a manipulation unit position), according to conversion information stored in the conversion information storage unit 14. The load characteristics storage unit 15 stores load characteristics (see FIG. 3) used to control the load for the pressing manipulation for the manipulation knob 101B.

The load control unit 16 determines a load corresponding to the stroke position, obtained by the conversion unit 13, of the manipulation shaft 101, as a load to be applied to the manipulation shaft 101 (that is, the pressing manipulation for the manipulation knob 101B), according to the load characteristics stored in the load characteristics storage unit 15. Then, the load control unit 16 controls the force sense generator 102 to have it apply the determined load to the manipulation shaft 101 (that is, the pressing manipulation for the manipulation knob 101B).

For each of a plurality of movement limit positions to be adjusted by the adjustment unit 104, the creation unit 17 acquires, from the sensor 103, a detection value at a time when the manipulation shaft 101 has reached the relevant movement limit position, after which the creation unit 17 creates conversion information to be used by the conversion unit 13, according to a plurality of acquired detection values and to positional information indicating the actual position of each of the plurality of movement limit positions. The conversion information created by the creation unit 17 is stored in the conversion information storage unit 14.

In this embodiment, the creation unit 17 may create an approximate expression used to calculate a stroke position of the manipulation shaft 101 from a detection value of the sensor 103, as an example of conversion information.

When the creation unit 17 creates conversion information, the detection value acquisition control unit 18 may rotate the adjustment unit 104 to sequentially adjust the movement limit position of the manipulation shaft 101 to one of the plurality of movement limit positions. Each time the movement limit position of the manipulation shaft 101 is adjusted, the detection value acquisition control unit 18 may cause the manipulation shaft 101 to reach the relevant movement limit position and causes the creation unit 17 to acquire the detection value, of the sensor 103, corresponding to the relevant movement limit position.

The controller 10 is structured by having, for example, a central processing unit (CPU), a read-only memory (ROM), a random-access memory (RAM), and the like. The functional units, described above, of the controller 10 are implemented when, for example, the CPU executes programs stored in the ROM in the controller 10.

Example of Processing Flow by Controller 10

Figure 5:
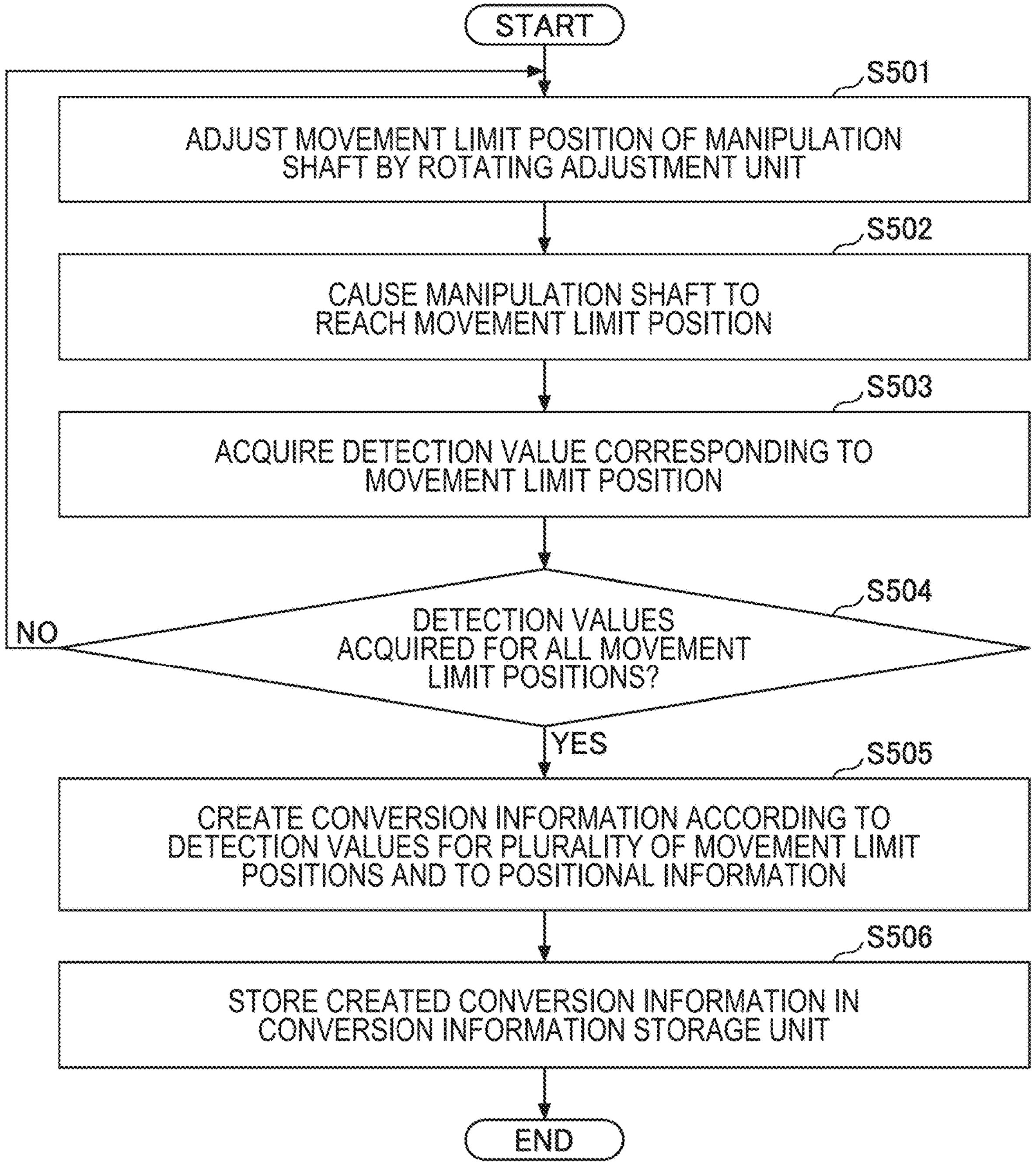
FIG. 5 is a flowchart illustrating an example of a procedure for processing by the controller included in the manipulation device in the embodiment.

FIG. 5 is a flowchart illustrating an example of a process flow performed by the controller 10 included in the manipulation device 100 in the embodiment.

First, the detection value acquisition control unit 18 controls the electrically powered unit 105 to have it rotate the adjustment unit 104 so that the movement limit position of the manipulation shaft 101 is adjusted to any of a predetermined plurality of movement limit positions (that is, any of a plurality of steps formed on the contact surface 104A) (step S501).

Next, the detection value acquisition control unit 18 controls the force sense generator 102 to have it apply a force to the manipulation shaft 101 so that the manipulation shaft 101 moves downward and reaches the movement limit position (step S502). At this time, the force sense generator 102 functions as a movement control unit that can control the movement of the manipulation shaft 101.

In this case, when, for example, the output value of the sensor 103 does not change any longer, the detection value acquisition control unit 18 can decide that the manipulation shaft 101 has reached the movement limit position. However, this is not a limitation; the detection value acquisition control unit 18 may use another method to decide that the manipulation shaft 101 has reached the movement limit position.

Next, the creation unit 17 acquires the detection value corresponding to the movement limit position from the sensor 103 (step S503).

Next, the detection value acquisition control unit 18 decides whether detection values have been acquired for all of the predetermined plurality of movement limit positions (step S504).

If the detection value acquisition control unit 18 decides in step S504 that detection values have not been acquired for all of the predetermined plurality of movement limit positions (No in step S504), the controller 10 returns processing to step S501.

If the detection value acquisition control unit 18 decides in step S504 that detection values have been acquired for all of the predetermined plurality of movement limit positions (Yes in step S504), the creation unit 17 creates conversion information to be used by the conversion unit 13, according to a plurality of detection values acquired in step S503 and to positional information indicating the actual position of each of the predetermined plurality of movement limit positions (step S505).

Then, the creation unit 17 stores the conversion information created in step S505 in the conversion information storage unit 14 (step S506). After that, the controller 10 terminates the series of processing illustrated in FIG. 5.

Example of Structure of Adjustment Unit 104

Figure 6:
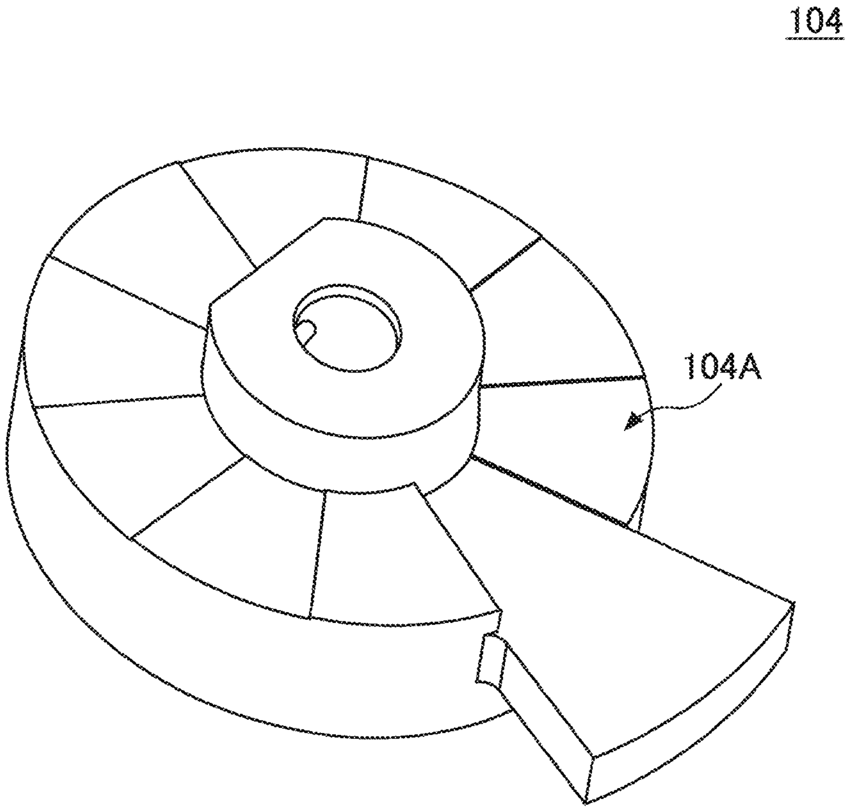
FIG. 6 illustrates the structure of an adjustment unit included in the manipulation device in the embodiment.

FIG. 6 illustrates the structure of the adjustment unit 104 included in the manipulation device 100 in the embodiment. As illustrated in FIG. 6, the adjustment unit 104 has the contact surface 104A formed spirally in a stepped shape. Thus, when the rotation of the adjustment unit 104 rotates, the adjustment unit 104 can change the contact position, at which the tip 101A of the manipulation shaft 101 makes contact, on the contact surface 104A in steps. Therefore, the movement limit position of the manipulation shaft 101 can be changed in steps. Particularly, in the example illustrated in FIG. 6, the contact surface 104A has a ten-step spiral shape. Therefore, when the manipulation device 100 in the embodiment rotates the adjustment unit 104 in increments of 36°, the manipulation device 100 can sequentially change the step of the contact surface 104A that the tip 101A of the manipulation shaft 101 will come into contact with.

The contact surface 104A may be in a smooth spiral shape without being limited to a spirally stepped shape. In this case, when the manipulation device 100 in the embodiment rotates and moves the adjustment unit 104, the manipulation device 100 can steplessly change the height position of the contact surface 104A that the tip 101A will come into contact with. In addition, the contact surface 104A may be formed spirally in nine steps or less or in 11 steps or more.

Furthermore, the contact surface 104A is not limited to the above shapes. It may suffice that the adjustment unit 104 has a contact surface having a plurality of contact positions along the axial direction of the manipulation shaft 101 and that when a periphery in the axial direction is rotated to change the contact position at which the tip 101A of the manipulation shaft 101 will make contact with the contact surface 104A, the movement limit position of the manipulation shaft 101 used as a manipulation unit can be adjusted.

<Method of Detecting Position of Manipulation Shaft 101 performed by Sensor 103>

Figure 7B:
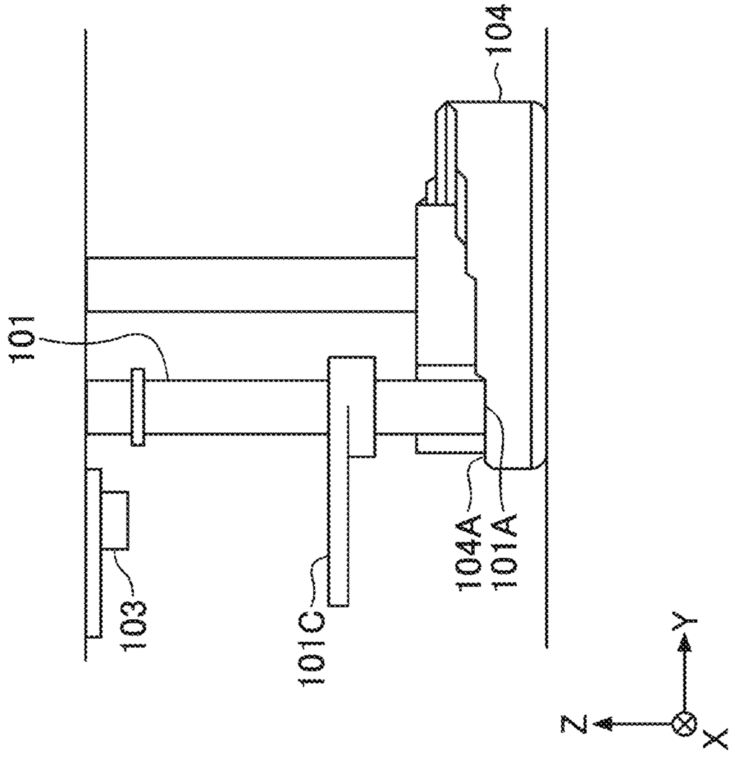
FIGS. 7A and 7B illustrate a method in which a sensor included in the manipulation device in the embodiment detects the position of a manipulation shaft.
Figure 7A:
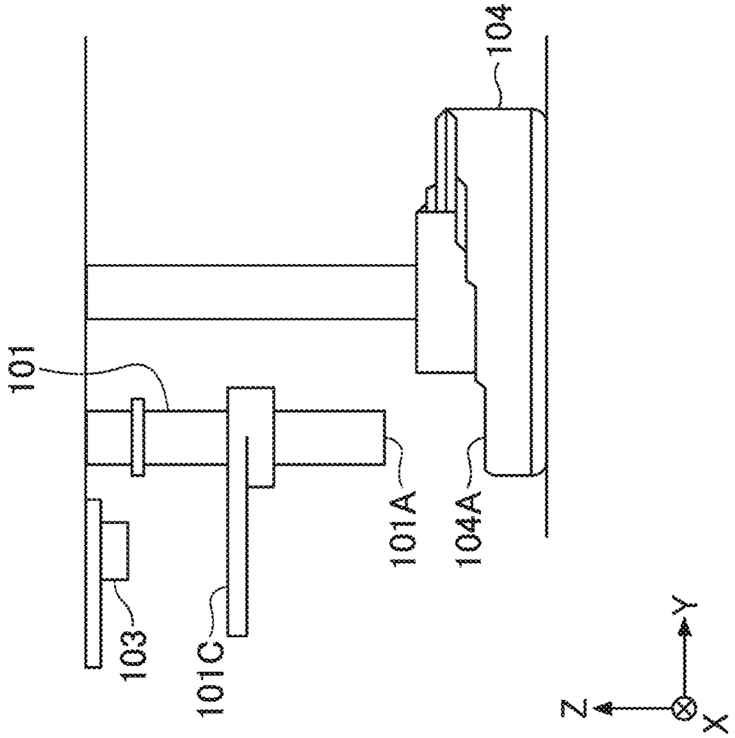

FIGS. 7A and 7B illustrate a method in which the sensor 103 included in the manipulation device 100 in the embodiment detects the position of the manipulation shaft 101.

In the manipulation device 100 in the embodiment, the adjustment unit 104 is disposed immediately below the manipulation shaft 101, as illustrated in FIGS. 7A and 7B. With the manipulation device 100 in the embodiment, therefore, when the manipulation shaft 101 is moved downward to bring the tip 101A of the manipulation shaft 101 into contact with the contact surface 104A of the adjustment unit 104, the manipulation shaft 101 can reach the movement limit position, as illustrated in FIG. 7B.

In the manipulation device 100 in the embodiment, the reflecting plate 101C is disposed immediately below the sensor 103, as illustrated in FIGS. 7A and 7B. Since the reflecting plate 101C is fixed to the manipulation shaft 101, the reflecting plate 101C moves in the up-down direction (the Z-axis direction) together with the manipulation shaft 101. Therefore, when the manipulation shaft 101 has already reached the movement limit position as illustrated in FIG. 7B, the sensor 103 can output a detection value corresponding to the movement limit position by detecting the distance to the reflecting plate 101C.

The contact surface 104A of the adjustment unit 104 has a spirally stepped shape. Therefore, the manipulation device 100 in the embodiment can change the step, on the contact surface 104A, that the tip 101A of the manipulation shaft 101 will come into contact with by rotating the adjustment unit 104. Thus, the manipulation device 100 can adjust the movement limit position of the manipulation shaft 101.

Example of Positional Information and Detection Value for Each Movement Limit Position FIG. 8 illustrates an example of positional information and the detection value, which are used in the manipulation device 100 in the embodiment, for each movement limit position.

In the manipulation device 100 in the embodiment, positional information (in this embodiment, represented as the amount of stroke of the manipulation shaft 101) is set in advance for each of a plurality of movement limit positions, the positional information indicating the actual position of the movement limit position, as illustrated in FIG. 8.

Then, the manipulation device 100 in the embodiment acquires a detection value of the sensor 103 for each of the plurality of movement limit positions, the detection value corresponding to the position of the manipulation shaft 101 at the time when the manipulation shaft 101 has reached the relevant movement limit position, as illustrated in FIG. 8.

In the example illustrated in FIG. 8, since the contact surface 104A of the adjustment unit 104 has a ten-step spiral shape, positional information is set in advance for each of 10 movement limit positions, which are determined according to the shape of the contact surface 104A. In addition, detection values of the sensor 103 have been acquired.

In FIG. 8, positional information 0 indicates the amount of stroke of the manipulation shaft 101 at the time when no pressing manipulation has been performed, that is, the initial position of the manipulation shaft 101. In the example illustrated in FIG. 8, a detection value of the sensor 103 has been acquired for this initial position of the manipulation shaft 101 as well.

Example of Conversion Information Creation

Figure 9:
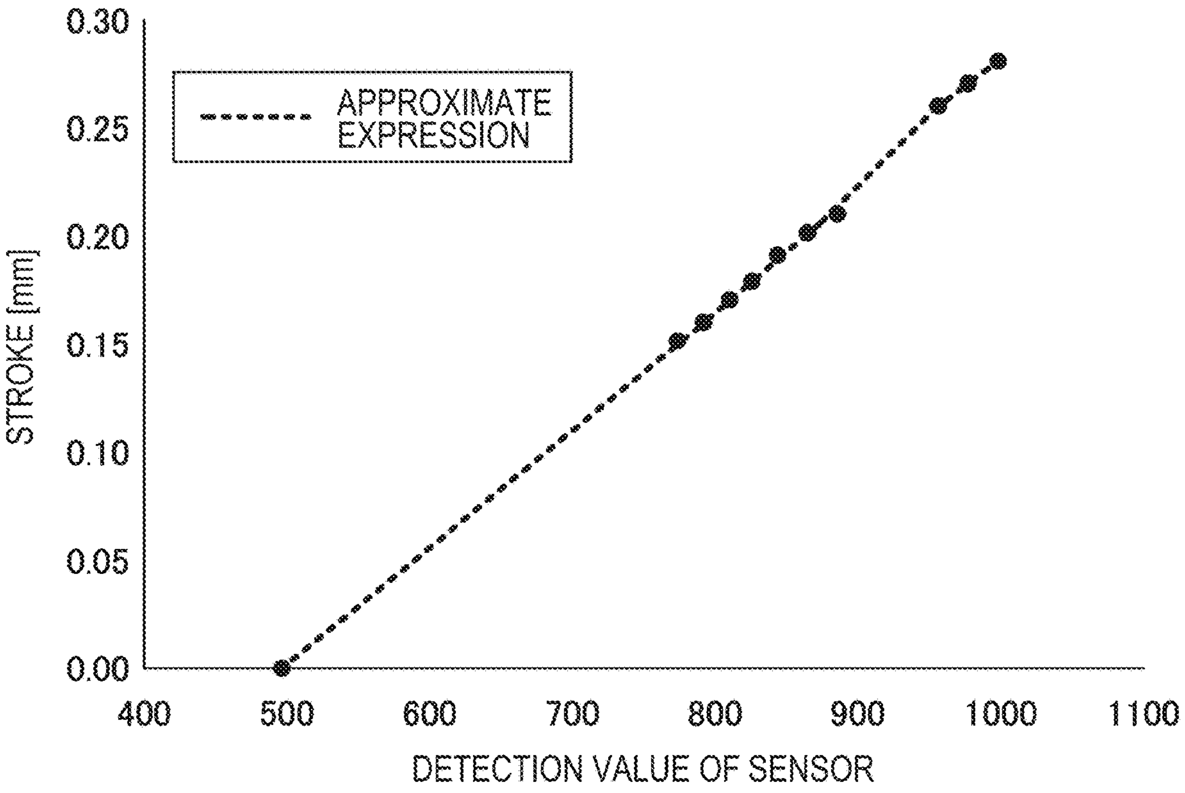
FIG. 9 illustrates an example of conversion information creation by the controller included in the manipulation device in the embodiment.

FIG. 9 illustrates an example of conversion information creation by the controller 10 included in the manipulation device 100 in the embodiment. The graph illustrated in FIG. 9 represents an approximate expression created by the creation unit 17 in the controller 10. The vertical axis indicates the stroke position of the manipulation shaft 101, and the horizontal axis indicates the detection value of the sensor 103.

As illustrated in FIG. 9, the creation unit 17 in the controller 10 can create an approximate expression used to calculate a stroke position of the manipulation shaft 101 from a detection value of the sensor 103, according to positional information about each of a plurality of movement limit positions and to the detection value for each of the plurality of movement limit positions, the plurality of movement limit positions and the detection values for them being illustrated in FIG. 8.

The approximate expression created in this way is stored in the conversion information storage unit 14 in the controller 10. After that, the conversion unit 13 in the controller 10 can convert a detection value, acquired by the acquisition unit 12, of the sensor 103 to a stroke position of the manipulation shaft 101 by using the approximate expression stored in the conversion information storage unit 14.

The approximate expression illustrated in FIG. 9 is highly precise because it has been created according to a plurality of actually measured values (the detection values of a plurality of sensors 103) for which differences among individual manipulation devices 100 and the like have been additionally considered. Therefore, when the manipulation device 100 in the embodiment uses the approximate expression illustrated in FIG. 9 to calculate the stroke position of the manipulation shaft 101, the manipulation device 100 can highly precisely calculate the stroke position of the manipulation shaft 101 with the suppression of the effects of differences among individual manipulation devices themselves and other differences in assembling error, time-varying changes, and the like among the individual manipulation devices.

The manipulation device 100 may create conversion information at a predetermined timing (for example, at shipping from the factory, at the time of first use, at intervals of a predetermined period, at intervals of a predetermined length of usage time, and the like) or at a timing specified by the user. When the manipulation device 100 periodically performs conversion information creation, the effect of time-varying changes of the manipulation device 100 can be suppressed, resulting in highly precise conversion information.

In this embodiment, an approximate expression is created as an example of conversion information. However, this is not a limitation; a conversion table, for example, may be created that is used to convert a detection value of the sensor 103 to a stroke position of the manipulation shaft 101.

Effects

As described above, the manipulation device 100 according to the embodiment has: the manipulation shaft 101 on which a movement manipulation is possible, the sensor 103 that outputs a detection value according to the position of the manipulation shaft 101; the acquisition unit 12 that acquires the detection value output from the sensor 103; the conversion unit 13 that converts the detection value acquired by the acquisition unit 12 to the position of the manipulation shaft 101, according to conversion information;

the adjustment unit 104 that can adjust the movement limit position of the manipulation shaft 101; and the creation unit 17 that acquires, from the sensor 103, a detection value at the time when the manipulation shaft 101 has reached each of a plurality of movement limit positions adjustable by the adjustment unit 104, and creates conversion information according to a plurality of acquired detection values and to positional information indicating the actual positions of the plurality of movement limit positions.

Thus, according to the manipulation device 100 in the embodiment, highly precise conversion information used to convert a detection value of the sensor 103 to the position of the manipulation shaft 101 can be easily created.

Particularly, according to the manipulation device 100 in the embodiment, since a detection value at the time when the manipulation shaft 101 has reached a movement limit position is acquired from the sensor 103, a detection value of the sensor 103 when the position of the manipulation shaft 101 is stable can be acquired, so more highly precise conversion information can be created.

In the manipulation device 100 in the embodiment, the creation unit 17 creates, as conversion information, an approximate expression used to calculate the position of the manipulation shaft 101 from a detection value of the sensor 103.

Thus, according to the manipulation device 100 in the embodiment, the conversion unit 13 can use the approximate expression created by the creation unit 17 to highly precisely calculate the position of the manipulation shaft 101 from a detection value of the sensor 103. Also, according to the manipulation device 100 in the embodiment, when the approximate expression is used, the position of the manipulation shaft 101 can be highly precisely calculated for an intermediate position as well, at which measurement for a detection value has not been performed during conversion information creation.

The manipulation device 100 in the embodiment also has the detection value acquisition control unit 18 that sequentially adjusts the adjustment unit 104 to each of the plurality of movement limit positions during conversion information creation by the creation unit 17, after which, at each movement limit position adjustment, the detection value acquisition control unit 18 causes the manipulation shaft 101 to reach the relevant movement limit position, and causes the creation unit 17 to acquire the detection value, of the sensor 103, corresponding to the relevant movement limit position.

Thus, according to the manipulation device 100 in the embodiment, a detection value at each of a plurality of movement limit positions can be automatically acquired under control of the detection value acquisition control unit 18, so extra work involved in the user can be reduced.

The manipulation device 100 in the embodiment also has the force sense generator 102 (load applying unit) that applies a load to a movement manipulation for the manipulation shaft 101. The detection value acquisition control unit 18 drives the force sense generator 102 to cause the manipulation shaft 101 to reach a movement limit position.

Thus, according to the manipulation device 100 in the embodiment, it is possible to cause the manipulation shaft 101 to automatically reach a movement limit position under control of the detection value acquisition control unit 18, so extra work involved in the user can be reduced.

This completes the detailed description of an embodiment of the present invention. However, the present invention is not limited to the embodiment. Various variations and modifications are possible without departing from the intended scope, described in the claims, of the present invention.

In the embodiment, an example has been described in which the present invention is applied to a manipulation device on which a pressing manipulation is possible as an example of a movement manipulation for the manipulation unit. However, this is not a limitation; the present invention can also be applied to a manipulation device on which other manipulations (such as, for example, a rotation manipulation, a slide manipulation, and the like) are possible as movement manipulations for the manipulation unit.

In this embodiment, a detection value of the sensor 103 has been acquired for each of a plurality of positions, which had been set in advance, of the manipulation shaft 101, and conversion information has been created according to a plurality of acquired detection values. However, the position of the manipulation shaft 101 may be measured for each of a plurality of detection values, which have been set in advance, of the sensor 103, and conversion information may be created according to a plurality of measured positions, for example.

In the structure in the embodiment, the detection value acquisition control unit 18 has driven the force sense generator 102 (movement control unit) to cause the manipulation shaft 101 (manipulation unit) to automatically reach a movement limit position. However, this is not a limitation; a structure may be taken in which the user manually causes the manipulation shaft 101 to reach a movement limit position by performing a movement manipulation for the manipulation shaft 101.

What is claimed is:

1. A manipulation device comprising:

a manipulation unit configured to move according to a movement manipulation applied thereon;

a sensor configured to output a detection value according to an amount of movement of the manipulation unit;

a conversion unit configured to convert the detection value into information of a position of the manipulation unit, according to conversion information;

an adjustment unit configured to adjust a movement limit of the manipulation unit by providing a plurality of movement limit positions for the manipulation unit; and a creation unit configured to acquire the detection value when the manipulation unit reaches each of the plurality of movement limit positions, thereby obtaining a plurality of detection values corresponding to the plurality of movement limit positions, and to create the conversion information based on the plurality of detection values and pre-set positional information indicating actual positions of the plurality of movement limit positions.

2. The manipulation device according to claim 1, wherein the creation unit is configured to create, as the conversion information, an approximate expression for calculating the position of the manipulation unit from the detection value.

3. The manipulation device according to claim 1, further comprising:

a detection value acquisition control unit configured to sequentially set the adjustment unit to have one of the plurality of movement limit positions and to cause the manipulation unit to reach the one of the plurality of movement limit positions thus set in the adjustment unit, thereby causing the creation unit to acquire the detection value for each of the plurality of movement limit positions, while the creation unit creates the conversion information.

4. The manipulation device according to claim 3, further comprising:

a movement control unit configured to control movement of the manipulation unit, wherein the detection value acquisition control unit is further configured to drive the movement control unit to cause the manipulation unit to reach each of the plurality of movement limit positions.

5. The manipulation device according to claim 4, wherein the movement control unit is a load applying unit configured to apply a load to the movement manipulation on the manipulation unit.

6. The manipulation device according to claim 1, wherein the manipulation unit includes a manipulation shaft movable in in an axial direction thereof according to the movement manipulation, and the adjustment unit has a contact surface with which a tip of the manipulation shaft makes contact, and wherein the plurality of movement limit positions are provided by changing a contact position at which the tip of the manipulation shaft make contact with the contact surface of the adjustment unit.

7. The manipulation device according to claim 6, wherein the adjustment unit is rotatable around a rotation axis thereof and the contact surface includes a plurality of locations provided around the rotation axis, the plurality of locations having different heights along the rotation axis, and wherein the contact position is changed by rotating the adjustment unit such that the tip of the manipulation shaft makes contact with different one of the plurality of locations on the contact surface.

8. The manipulation device according to claim 1, wherein the amount of movement of the manipulation unit is a distance in an axial direction of the manipulation unit.

9. A method for manipulating a manipulation device having a manipulation unit movable according to a movement manipulation applied thereon and an adjustment unit providing a plurality of movement limit positions for the manipulation unit, the method comprising:

outputting a detection value according to an amount of movement of the manipulation unit;

converting the detection value into information of a position of the manipulation unit, according to conversion information;

acquiring the detection value at a time when the manipulation unit reaches each of the plurality of movement limit positions provided by the adjustment unit, thereby obtaining a plurality of detection values corresponding to the plurality of movement limit positions; and creating the conversion information based on the plurality of detection values and pre-set positional information indicating actual positions of the plurality of movement limit positions.

* * * * *